Patented Dec. 8, 1931

1,835,394

UNITED STATES PATENT OFFICE

WINFRID HENTRICH, OF WIESDORF-ON-THE-RHINE, RUDOLF KNOCHE, LEVERKUSEN-ON-THE-RHINE, ERNST TIETZE, OF COLOGNE-ON-THE-RHINE, AND JOSEF HILGER, OF COLOGNE-MULHEIM, GERMANY, ASSIGNORS TO GENERAL ANILINE WORKS, INC., OF NEW YORK, N. Y., A CORPORATION OF DELAWARE

SULFONIC ACIDS OF THE NITROHALOGEN-DIARYL-KETONES, AND NITROHALOGEN DIARYL-SULFONES

No Drawing. Application filed July 1, 1929, Serial No. 375,324, and in Germany July 4, 1928.

The present invention relates to a process of preparing sulfonic acids of the nitrohalogen-diaryl-ketones and nitrohalogen-diaryl-sulfones and to the new substances obtainable thereby, more particularly it relates to compounds of the probable general formula

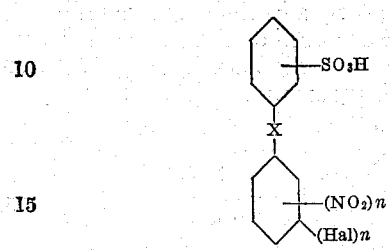

wherein X stands for a C=O or SO$_2$ group, Hal stands for a halogen atom, and $n$ for one of the numbers one and two, and wherein the benzene nuclei may be further substituted by halogen, alkyl- or alkyloxy groups.

In accordance with the present invention the sulfonic acids of the above mentioned general formula are prepared by treating a compound of the general formula

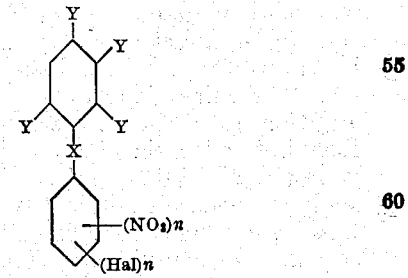

wherein X stands for a C=O or SO$_2$ group, Y stands for hydrogen which may be substituted by halogen, alkyl- or alkyloxy groups, $n$ stands for one of the numbers one and two and wherein the benzene nucleus containing the halogen and nitro-groups may be further substituted by halogen, alkyl or alkyloxy with one of the customary sulfonating agents, such as concentrated sulfuric acid, sulfuric acid containing anhydride or chloro sulfonic acid. Compounds of the type named, suitable for sulfonation are, for example:—

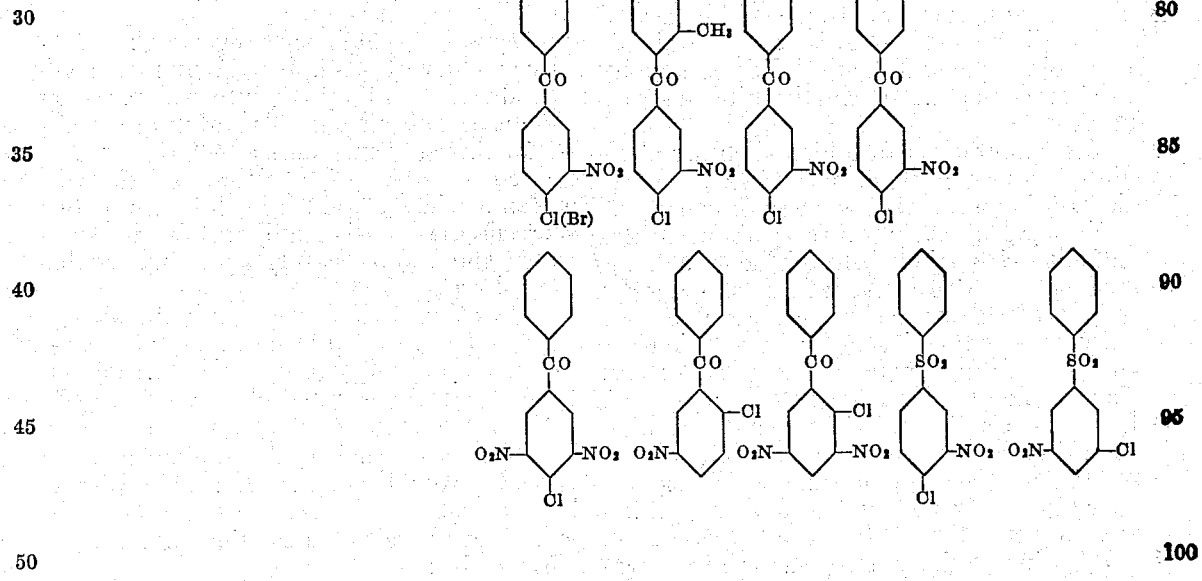

and the like. The temperatures may be varied within wide limits, temperatures between about 20–90° C. were found to be of advantage, but the sulfonation may be carried out at lower or higher temperatures without departing from the spirit of our invention. The sulfonation proceeds very easily and smoothly and is complete generally after several hours, say one to five hours, the time required of course depending upon the temperature used and somewhat upon the specific compound to be sulfonated. The sulfo groups in all probability enter the nucleus which does not contain the nitrohalogen group, presumably in the meta position to the —SO$_2$- or —CO-groups. The sulfonation being complete, the reaction mixture is poured on to ice whereupon the new sulfonic acids separate either directly in a crystalline form or in an oily form, which oils afterwards solidify. The separation can be completed by the addition of salts. After recrystallization from hot water, they are obtained in form of yellowish colored crystals. The new sulfonic acids are generally difficultly soluble in cold water, their alkali metal salts are beautifully crystallizing substances. The new sulfonic acids, after transformation of their reactive groups, as for example, by exchange of the halogen atoms with compounds containing reactive hydrogen atoms combined with nitrogen, oxygen or sulfur atoms or by reduction of the nitro groups, form valuable starting materials for the manufacture of dyestuffs. The following examples will illustrate our invention, but without limiting it thereto.

*Example 1.*—261 parts by weight of 3-nitro-4-chloro-benzophenone are dissolved at room temperature in 1000 parts by weight of sulfuric acid containing 20% of anhydride. Only a slight rise of temperature occurs. The solution is then heated with stirring for one hour at 60° C. and for two hours at 80–90° C. The sulfonation mixture is poured on to ice and the new sulfonic acid separated with sodium chloride. It is precipitated first in an oily state and then solidifies gradually to a thick magma of small white, lustrous needles.

The manufacture of 3-nitro-4-chloro-2'-4'-dimethyl-benzophenone sulfonic acid is carried out in an exactly analogous manner.

*Example 2.*—291 parts by weight of 4-chloro-3-nitro-4'-methoxybenzophenone are introduced at 10–15° C. into 1000 parts by weight of sulfuric acid containing 20% of anhydride with stirring. The solution occurs smoothly without rise of temperature. The solution is then heated slowly to 20–30° C. After two to three hours, sulfonation is complete, the mixture is poured on to ice and salted out. The new sulfonic acid is precipitated in an oily state and gradually solidifies to a magma of quite fine small needles.

By using as the starting material 5-nitro-2-chloro-benzophenone, the 5-nitro-2-chlorobenzophenone, sulfonic acid is obtained, the sodium salt of which crystallizes likewise in fine small needles.

*Example 3.*—306 parts by weight of 3.5 dinitro-4-chlorobenzophenone are introduced at room temperature into 200 parts by weight of sulfuric acid containing 20% of anhydride. Only a slight rise of temperature occurs. The mixture is heated for two hours at 50–60° C., then poured on to ice and the clear solution thus obtained is salted out with sodium chloride. The new acid, after dissolving in dilute sodium chloride solution, crystallizes in long, thin needles possessing a silky lustre.

The monosulfonic acid from 3.5-dinitro-2-chloro-benzophenone is obtained in an exactly similar manner.

*Example 4.*—200 parts by weight of 3-nitro-4-chloro-1:1'-diphenyl-sulphone (M. P. 126–127° C.) are introduced at ordinary temperature into 600 parts by weight of 20% oleum. The mixture is heated for two hours to 50° C. and then poured on to ice. On salting out the new sulfonic acid having probably the following formula

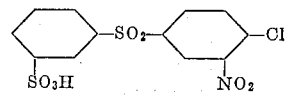

is obtained. The chlorine atom of the ortho chloro nitrodiphenyl-sulphone-sulfonic acid thus obtained can be replaced by the OH-group on heating with the equivalent quantity of caustic soda. By subsequent reduction of the nitro-group with iron and acetic acid (according to the customary method), the 3-amino-4-hydroxy-1:1'-diphenyl-sulphone-3'-sulfonic acid is obtained in the form of brown leaflets, which are somewhat sparingly soluble in hot water. The diazo compound is readily soluble and couples extraordinarily energetically.

*Example 5.*—297 parts by weight of 5-nitro-2-chloro-1:1'-diphenyl-sulphone are introduced at 10–15° C. into 900 parts by weight of 20% oleum. The mixture is heated for three to four hours at 50° C. and then poured on to ice. On salting out, the new sulfonic acid is obtained in the form of fine small needles. It is readily soluble in warm water and comparatively sparingly soluble in cold water.

By heating with an excess of ammonia under pressure, the chlorine atom can be replaced by the amino group. The ammonium 5-nitro-2-amino-1:1'-diphenyl-sulfone-3'-sulfonate crystallizes in plates, which easily assume a pale greenish yellow coloration. It is readily soluble in water and can be diazotized at 20–25° C. The diazo compound yields with R-salt a bluish violet dyestuff.

We claim:

1. The process which comprises treating a compound of the probable general formula

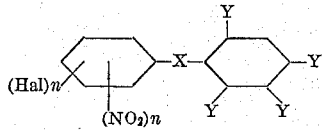

wherein X stands for a radical of the group consisting of C=O and SO$_2$, Y stands for hydrogen which may be substituted by substituents of the group consisting of halogen, alkyl and alkyloxy, Hal stands for a halogen atom and $n$ stands for one of the numbers one and two, and wherein the benzene nucleus containing the halogen and nitro-groups may be further substituted by substituents of the group consisting of halogen, alkyl and alkyloxy with a sulfonating agent of the group consisting of concentrated sulfuric acid, sulfuric acid containing SO$_3$ and chlorosulfonic acid at a temperature between 20 and 90° C. for from one to five hours.

2. The process which comprises treating a compound of the probable general formula

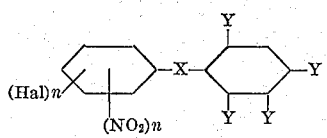

wherein X stands for a radical of the group consisting of C=O and SO$_2$, Y stands for hydrogen which may be substituted by substituents of the group consisting of halogen, alkyl and alkyloxy, Hal stands for a halogen atom standing in ortho position to the nitro-group, $n$ stands for one of the numbers one and two and wherein the benzene nucleus containing the halogen and nitro-groups may be further substituted by substituents of the group consisting of halogen, alkyl and alkyloxy with a sulfonating agent of the group consisting of concentrated sulfuric acid, sulfuric acid containing SO$_3$ and chlorosulfonic acid at a temperature between 20 and 90° C. for from one to five hours.

3. The process which comprises treating a compound of the probable general formula

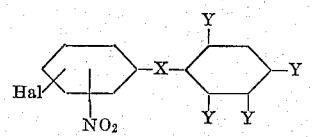

wherein X stands for a radical of the group consisting of C=O and SO$_2$, Y stands for hydrogen which may be substituted by substituents of the group consisting of halogen, alkyl and alkyloxy, Hal stands for a halogen atom standing in ortho position to the nitro-group and wherein the benzene nucleus containing the halogen and nitro-groups may be further substituted by substituents of the group consisting of halogen, alkyl and alkyloxy with a sulfonating agent of the group consisting of concentrated sulfuric acid, sulfuric acid containing SO$_3$ and chlorosulfonic acid at a temperature between 20 and 90° C. for from one to five hours.

4. The process which comprises treating a compound of the probable general formula

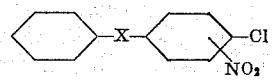

wherein X stands for a radical of the group consisting of C=O and SO$_2$, and wherein the nuclei may be further substituted by substituents of the group consisting of halogen, alkyl and oxyalkyl with sulfuric acid containing sulfuric acid anhydride at a temperature between about 20–90° C. for one to several hours.

5. The process which comprises treating 3-nitro-4-chloro-1.1-diphenyl-sulfone with 20% oleum at about 50° C. for about two hours.

6. As new products the compounds of the probable general formula

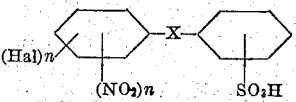

wherein X stands for a radical of the group consisting of C=O and SO$_2$, wherein Hal stands for a halogen atom and $n$ stands for one of the numbers one and two, and wherein the benzene nuclei may be further substituted by substituents of the group consisting of halogen, alkyl and alkyloxy, being generally yellowish colored crystalline substances, difficulty soluble in cold water, forming beautifully crystallizing alkali metal salts and being valuable substances in the manufacture of dye-stuffs.

7. As new products the compounds of the probable general formula

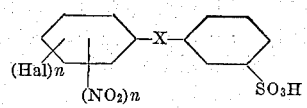

wherein X stands for a radical of the group consisting of C=O and SO$_2$, wherein Hal stands for a halogen atom and $n$ stands for one of the numbers one and two, and wherein the benzene nuclei may be further substituted by substituents of the group consisting of halogen, alkyl and alkyloxy, being generally yellowish colored crystalline substances, difficultly soluble in cold water, forming beautifully crystallizing alkali metal salts and being valuable substances in the manufacture of dyestuffs.

8. As new products the compounds of the probable general formula

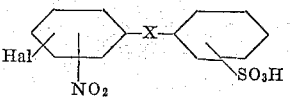

wherein X stands for a radical of the group consisting of C=O and SO$_2$, wherein Hal stands for a halogen atom, and wherein the benzene nuclei may be further substituted by substituents of the group consisting of halogen, alkyl, and alkyloxy, being generally yellowish colored crystalline substances, difficultly soluble in cold water, forming beautifully crystallizing alkali metal salts and being valuable substances in the manufacture of dyestuffs.

9. As new products the compounds of the probable general formula

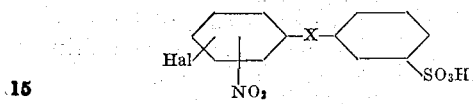

wherein X stands for a radical of the group consisting of C=O and $SO_2$ wherein Hal stands for a halogen atom the nitro-group standing in ortho position to the halogen atom and wherein the benzene nuclei containing the halogen and nitro-groups may be further substituted by substituents of the group consisting of halogen, alkyl and alkyloxy being generally yellowish colored crystalline substances, difficultly soluble in cold water, forming beautifully crystallizing alkali metal salts and being valuable substances in the manufacture of dyestuffs.

10. As new products the compounds of the probable general formula

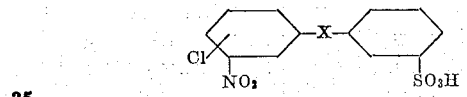

wherein X stands for a radical of the group consisting of C=O and $SO_2$, and wherein the benzene nuclei may be further substituted by substituents of the group consisting of halogen, alkyl and alkyloxy being generally yellowish colored crystalline substances difficultly soluble in cold water, forming beautifully crystallizing alkali metal salts and being valuable substances in the manufacture of dyestuffs.

11. As a new product the compound of the probable formula

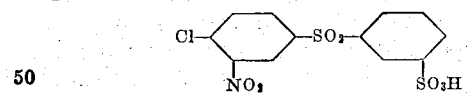

being a yellowish colored crystalline substance, difficultly soluble in cold water, forming beautifully crystallizing alkali metal salts and being a valuable substance in the manufacture of dyestuffs.

In testimony whereof we have hereunto set our hands.

WINFRID HENTRICH. [L. S.]
RUDOLF KNOCHE. [L. S.]
ERNST TIETZE. [L. S.]
JOSEF HILGER. [L. S.]